US012492416B2

(12) United States Patent
Thirumalai et al.

(10) Patent No.: US 12,492,416 B2
(45) Date of Patent: Dec. 9, 2025

(54) PRODUCTION OF L-2-AMINOBUTYRATE FROM CITRAMALATE, CITRACONATE OR 2-OXOBUTANOATE

(71) Applicant: ANNA UNIVERSITY, Chennai (IN)

(72) Inventors: Akila Thirumalai, Chennai (IN); Padmapriya Ganapathy Raman, Chennai (IN); Anitha Janet Roshni Yesudhas, Chennai (IN); Tamilselvan Jayavelu, Kanchipuram (IN); Nikhil Sangith, Palakkad (IN); Mahalakshmi Natarajan, Chennai (IN); Pandiraj Suppuram, Srivilliputtur Taluk (IN); Ramalingam Subramanian, Chennai (IN)

(73) Assignee: ANNA UNIVERSITY, Chennai (IN)

( * ) Notice: Subject to any disclaimer, the term of this patent is extended or adjusted under 35 U.S.C. 154(b) by 934 days.

(21) Appl. No.: 17/282,531

(22) PCT Filed: Oct. 4, 2019

(86) PCT No.: PCT/IB2019/058461
§ 371 (c)(1),
(2) Date: Apr. 2, 2021

(87) PCT Pub. No.: WO2020/070699
PCT Pub. Date: Apr. 9, 2020

(65) Prior Publication Data
US 2022/0243233 A1 Aug. 4, 2022

(30) Foreign Application Priority Data

Oct. 4, 2018 (IN) .............................. 201841037493

(51) Int. Cl.
| | | |
|---|---|---|
| *C12P 13/04* | (2006.01) | |
| *C12N 1/21* | (2006.01) | |
| *C12N 9/04* | (2006.01) | |
| *C12N 9/06* | (2006.01) | |
| *C12N 9/10* | (2006.01) | |
| *C12N 9/12* | (2006.01) | |
| *C12N 9/88* | (2006.01) | |

(52) U.S. Cl.
CPC ............ *C12P 13/04* (2013.01); *C12N 9/0006* (2013.01); *C12N 9/0016* (2013.01); *C12N 9/1022* (2013.01); *C12N 9/1029* (2013.01); *C12N 9/1217* (2013.01); *C12N 9/88* (2013.01); *C12Y 101/01085* (2013.01); *C12Y 104/01008* (2013.01); *C12Y 202/01006* (2013.01); *C12Y 203/01008* (2013.01); *C12Y 207/02001* (2013.01); *C12Y 207/02015* (2013.01); *C12Y 402/01009* (2013.01); *C12Y 402/01033* (2013.01); *C12Y 402/01035* (2013.01)

(58) Field of Classification Search
None
See application file for complete search history.

(56) References Cited

U.S. PATENT DOCUMENTS

2012/0070868 A1* 3/2012 Lee .......................... C12N 9/88
435/254.11

FOREIGN PATENT DOCUMENTS

WO        2011106696 A2    9/2011

OTHER PUBLICATIONS

Atsumi et al., Directed Evolution of Methanococcus jannaschii citramalate synthase for biosynthesis of 1-propanol and 1-butanol by Escherichia coli, Appl. Env. Microbiol. 74, 2008, 7802-08. (Year: 2008).*
Zhang et al., Expanding metabolism for total biosynthesis of the nonnatural amino acid L-homoalanine, Proc. Natl. Acad. Sci. USA 107, 2010, 6234-39. (Year: 2010).*
Webb et al., Efficient bio-production of citramalate using an engineered Escherichia coli strain, Microbiology 164, 2018, 133-41. (Year: 2018).*
Nguyen et al., The Avermectin-Producing Streptornyces avermltilis Possesses an Inducible Valine Dehydrogenase, Biotechnol. Lett. 17, 1995, 151-56. (Year: 1995).*
Weber et al., Production of (S)-2-aminobutyric acid and (S)-2-aminobutanol in Saccharomyces cerevisiae, Microb. Cell. Fact. 16, 2017, 51. (Year: 2017).*
Lin et al., Whole-cell biocatalysts by design, Microb. Cell Fact. 16, 2017, 106. (Year: 2017).*
Safety Data Sheet, Santa Cruz Biotechnology, Citraconic acid, 2016. (Year: 2016).*
Wu et al., Synthesis of citramalic acid from glycerol by metabolically engineered Escherichia coli, J. Ind. Microbiol. Biotechnol. 44, 2017, 1483-90. (Year: 2017).*
Zhao et al., Impact of deletion of the genes encoding acetate kinase on production of L-tryptophan by Escherichia coli, Ann. Microbiol. 66, 2016, 261-69. (Year: 2016).*
Dudley et al., Cell-free metabolic engineering, Biotechnol. J. 10, 2015, 69-82. (Year: 2015).*
Park et al., One pot conversion of L-threonine into L-homoalanine, Adv. Synth. Catal. 352, 2010, 3391-98. (Year: 2010).*

(Continued)

Primary Examiner — Todd M Epstein
(74) Attorney, Agent, or Firm — Volpe Koenig

(57) ABSTRACT

The present invention relates to preparation of key drug intermediate, L-2-amino butyric acid (L-2-ABA) by a method of cell free system and biotransformation using genetically engineered strains from easily available economic substrates like citramalate or citraconate and enzymes like LeuCD, LeuB and ValDH or IlvE.

3 Claims, 2 Drawing Sheets

(56) References Cited

OTHER PUBLICATIONS

Zhang, K. et al. "Expanding metabolism for total biosynthesis of the nonnatural amino acid L-homoalanine" (2010) PNAS 107(140): 6234-6239.
Park, E. at al. "One-Pot Conversion of l-Threonine into l-Homoalanine: Biocatalytic Production of an Unnatural Amino Acid from a Natural One" (2010) Adv. Synth. Catal. 352: 3391-3398.
Narancic, T. et al. "Unnatural amino acids: production and biotechnological potential" (2019) World Journal of Microbiology and Biotechnology 35: 1-11.

* cited by examiner

Enzymatic biotransformation

PRODUCTION OF L-2-AMINOBUTYRATE FROM CITRAMALATE, CITRACONATE OR 2-OXOBUTANOATE

CROSS REFERENCE TO RELATED APPLICATIONS

This application is a 35 USC § 371 national stage of International Application No. PCT/IB2019/058461, which was Oct. 4, 2019, is titled PRODUCTION OF L-2-AMINOBUTYRATE FROM CITRAMALATE, CITRACONATE OR 2-OXOBUTANOATE, and claims priority to IN patent application No. 201841037493, filed Oct. 4, 2018, both of which are incorporated herein by reference as if fully set forth.

FIELD OF THE INVENTION

The present invention relates to preparation of key drug intermediate, L-2-aminobutyric acid (L-2-ABA) by a method of cell free system and biotransformation using genetically engineered strains and its cost effective application.

BACKGROUND OF THE INVENTION

L-2-ABA is an unnatural 4C aliphatic amino acid also known as L-homoalanine and a key chiral intermediate for the synthesis of important drugs namely anti-epileptic levetiracetam, brivaracetam and antituberculotic ethambutol. L-2-ABA was produced by chemical methods; however, such processes lead to undesirable racemic mixture. L-2-ABA is also produced by fermentation of glucose; and such processes result in low productivity levels of 5 g/l.

EP2539444 discloses inoculation of wild-type *E. coli* BW25113 cultures in M9 medium with addition of 10 g/L 2-ketobutyrate and incubation at 37° C. for 24 h. After 24 h, HPLC analysis showed production of only 182 mg/L L-homoalanine. The branched-chain amino acid aminotransferase IlvE was cloned and overexpressed in BW25113, which increased the production of L-homoalanine to 1.2 g/L. Additional feeding of 10 g/L amino donor glutamate further increased the L-homoalanine titer to 3.2 g/L. The experiments demonstrated that transaminases such as IlvE could aminate 2-ketobutyrate into L-homoalanine. However, high concentration of glutamate was needed to drive the reaction equilibrium because transamination is a reversible reaction process. Even under such extreme conditions, the conversion rate of transaminating 2-ketobutyrate to L-homoalanine was only 32%.

CN109777788 discloses a kind of leucine dehydrogenase mutant and a recombinant bacterium *E. coli* BL21-pET28a-BtLDH007, for expressing the enzyme activity of leucine dehydrogenase. *E. coli* BL21-pET28a-BtLDH007 was used for transformation of 2-ketobutyrate producing L-2-amino butyric acid. In a 1 L Transformation System, used 0.015-0.02 mol/L NaH2PO4-Na2HPO4buffer (pH 8.0) was dissolved 2-ketobutyric acid 80 g/L, a wet cell mass was added 20 g/L, ammonium formate concentration of 10 g/L, NAD$^+$ concentration of 1.0 g/L, a formate dehydrogenase enzyme to 1500 U/L, 4 mol/L NaOH solution control pH 8.0, a temperature of 30° C., 3 vvm aeration, agitation speed 300 rpm.

CN107012178 discloses that 2-ketobutyric acid is catalyzed by the aid of alanine dehydrogenase and formate dehydrogenase to produce the L-2-aminobutyric acid.

EP0983372 discloses a process for making L-2-aminobutyrate comprising: a) reacting L-threonine with threonine deaminase under conditions appropriate to produce 2-ketobutyrate; b) reacting the 2-ketobutyrate, L-aspartate and transaminase enzyme under conditions appropriate to produce oxaloacetate and L-2-aminobutyrate; c) allowing the oxaloacetate to form pyruvate; d) reacting the pyruvate with acetolactate synthase enzyme under conditions appropriate to produce acetolactate; e) allowing the acetolactate to form acetoin; and f) separately recovering acetoin and L-2-aminobutyrate.

CN105331650 discloses a method for co-production of alpha-aminobutyric acid and dihydroxyacetone by cascading glycerol dehydrogenase and L-amino acid dehydrogenase recombinant *Escherichia coli*. The method is characterized in that a recombinant coexpression vector is established through glycerol dehydrogenase genes and L-amino acid dehydrogenase genes and converted to genetically engineered bacteria *Escherichia coli*; meanwhile, recombinant *Escherichia coli* for expressing L-threonine deaminase is well established; efficiently co-expressed glycerol dehydrogenase and L-amino acid dehydrogenase can promote circulation of a cofactor in *Escherichia coli*, any exogenous cofactor is not required to be added, a cofactor cyclic regeneration system can be used for co-production of high value-added alpha-aminobutyric acid and dihydroxyacetone through cheap substrates, namely, L-threonine deaminase and glycerin. The yield of alpha-aminobutyric acid in a 5 L fermentation tank reaches 41.2 g/L.

Comments: This patent proposes utilizing glycerol dehydrogenase to recycle the cofactor NADH. As another substrate has to be added for the glycerol dehydrogenase to recycle the cofactor the process becomes cost inefficient.

CN102517351, CN102212567B and CN109679978 disclose method for producing L-2-aminobutyric acid from threonine.

The present invention solves the problems faced in the prior art wherein the L-2-ABA was produced by cell free system and biotransformation process by using less expensive substrate by using enzymatic or recombinant cell-based production method. The production of high value key drug intermediate L-2-ABA from cheaper substrate offers great economic value.

Even though L-2-ABA has been produced using enzymatic conversion of substrates, the processes are inefficient and uses starting materials which are expensive and not readily available in bulk quantities.

Therefore, there remains a need for an efficient and cost less expensive process for the production of L-2-ABA in high yield.

Accordingly, the present inventor provides a viable technology using cell free system and whole cell biotransformation which utilises cheaper substrate for production L-2-ABA through a redox balanced pathway catalysed by highly efficient enzymes.

OBJECTIVE OF THE INVENTION

An object of the present invention is to provide an efficient and cost effective process for the production of L-2-ABA in high yield.

Another object of the present invention is to provide a process for the production of L-2-ABA using less expensive substrates such as citramalate or citraconate.

It is a further object of the present invention to provide a process for the production of L-2-ABA using less expensive substrates such as citramalate or citraconate by enzymatic biotransformation in a cell free system.

It is yet another object of the present invention to provide a process for the production of L-2-ABA using enzymes which are efficient.

It is yet another object of the present invention to prepare key drug intermediate, L-2-ABA by biotransformation using genetically modified strains.

It is yet another object of the present invention to provide a process for the production of L-2-ABA which is easily scalable to large scale production and industrial manufacturing.

SUMMARY OF THE INVENTION

In one aspect, the present invention provides a process for production of L-2-ABA in high yield by an enzymatic biotransformation from a substrate selected from citramalate or citraconate in a cell free system.

In another aspect, the present invention provides a process using enzymes namely, isopropyl malate isomerase, isopropylmalate dehydrogenase, amino acid dehydrogenase/ transaminase B.

In a further aspect, the present invention provides a process for production of L-2-ABA in high yield by a cell free system; wherein the process comprises steps of:
  a) transforming a microbial host cell to incorporate leu B, leu CD, and valDH to express enzymes LeuCD, LeuB, and ValDH;
  b) harvesting, lysing of the host cell to obtain the crude lysate;
  c) optionally isolating and purifying and/or immobilizing the enzyme from the crude lysate;
  d) converting a substrate selected from citramalate or citraconate using the crude lysate or the purified enzyme or the immobilized enzyme at a pH of 7 to 9.

In another aspect the present invention provides a process for production of L-2-ABA in high yield by cell free system; wherein the process comprises steps of:
  a) transforming a microbial host cell to incorporate leu B, leu CD, and ilvE to express enzymes LeuCD, LeuB, and IlvE;
  b) harvesting, lysing of the host cell to obtain the crude lysate;
  c) optionally isolating and purifying and/or immobilizing the enzyme from the crude lysate;
  d) converting a substrate selected from citramalate or citraconate using the crude lysate or the purified enzyme or the immobilized enzyme at a pH of 7 to 9.

In yet another aspect, the present invention provides a process to produce L-2-ABA in high yield by whole cell biotransformation in a suitable host from a substrate wherein the substrate is selected from citramalate, citraconate or 2-oxobutanoate.

In yet another aspect, the present invention provides a process to produce L-2-ABA in high yield by whole cell biotransformation in a suitable host from a substrate wherein the substrate is selected from citramalate, citraconate or 2-oxobutanoate which is permeabilized cell.

In yet another aspect, the present invention provides a process to produce L-2-ABA which involves biotransformation in a whole cell or a permeabilized cell, wherein the process comprises steps of:
  a) transforming a microbial host to incorporate valDH or ilvE;
  b) optionally incorporating leu B or leu CD,
  c) adding a substrate selected from citramalate or citraconate or 2-oxobutanoate; and
  c) cultivating the host at a temperature of 20° C.-37° C. to express said enzymes in a suitable medium to obtain L-2-ABA.

In yet another aspect, the present invention provides a process to produce L-2-ABA in high yield in whole cell or permeabilized cell by enzymatic biotransformation in a suitable host from a substrate wherein the substrate is selected from citramalate, citraconate or 2-oxobutanoate may comprise knocking out ilvD and ilvIH.

In yet another aspect, the present invention provides a process to produce L-2-ABA in high yield in whole cell or permeabilized cell by enzymatic biotransformation in a suitable host from a substrate wherein the substrate is selected from citramalate, citraconate or 2-oxobutanoate may comprise knocking out ackA, tdcD, and pta.

BRIEF DESCRIPTION OF DRAWINGS

For a more complete understanding of the present invention, reference is now made to the following descriptions taken in conjunction with the accompanying drawing, in which.

DETAILED DESCRIPTION

Figure 1:
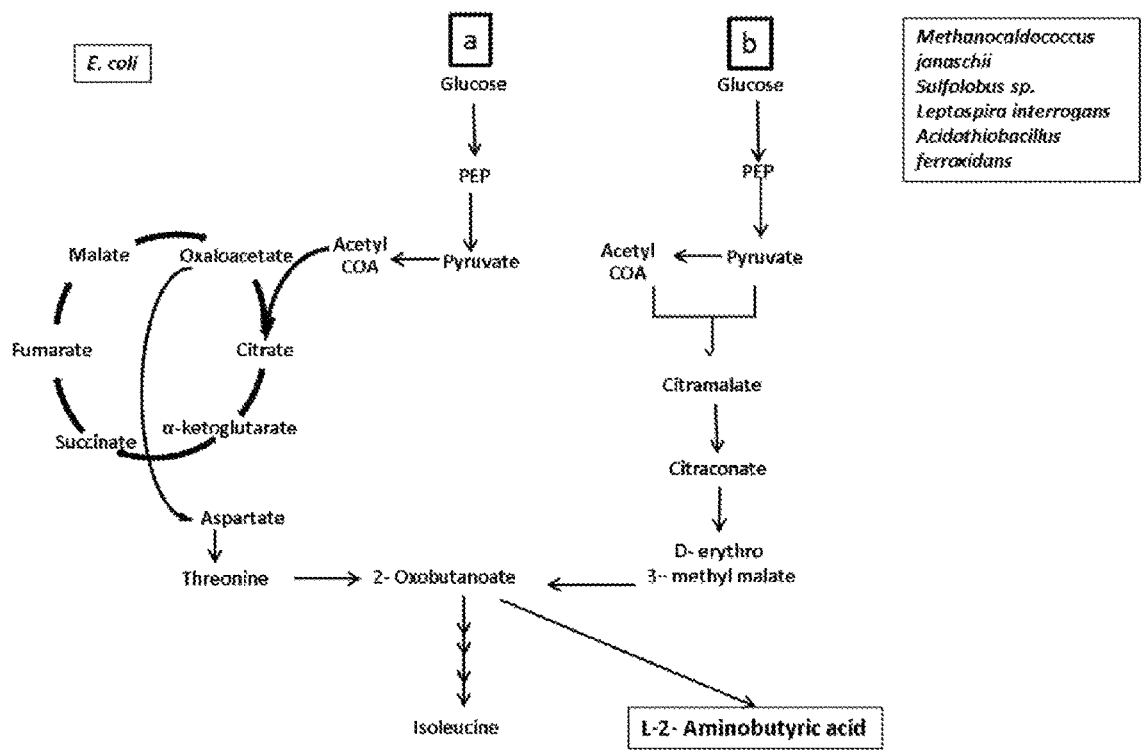
FIG. 1 illustrates an exemplary embodiment of the preparation of L-2-aminobutyic acid by alternative isoleucine biosynthetic pathway (b) in comparison with preparation from threonine (a).
Figure 2:
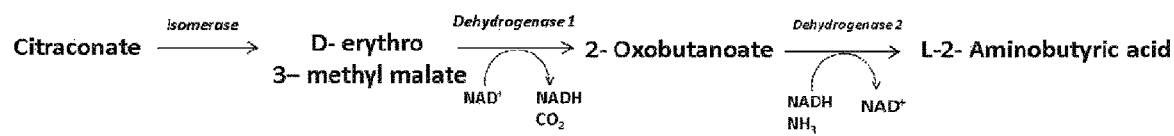
FIG. 2 illustrates an exemplary embodiment of the cell free enzymatic biotransformation for the preparation of L-2-aminobutyic acid.
Figure 3:
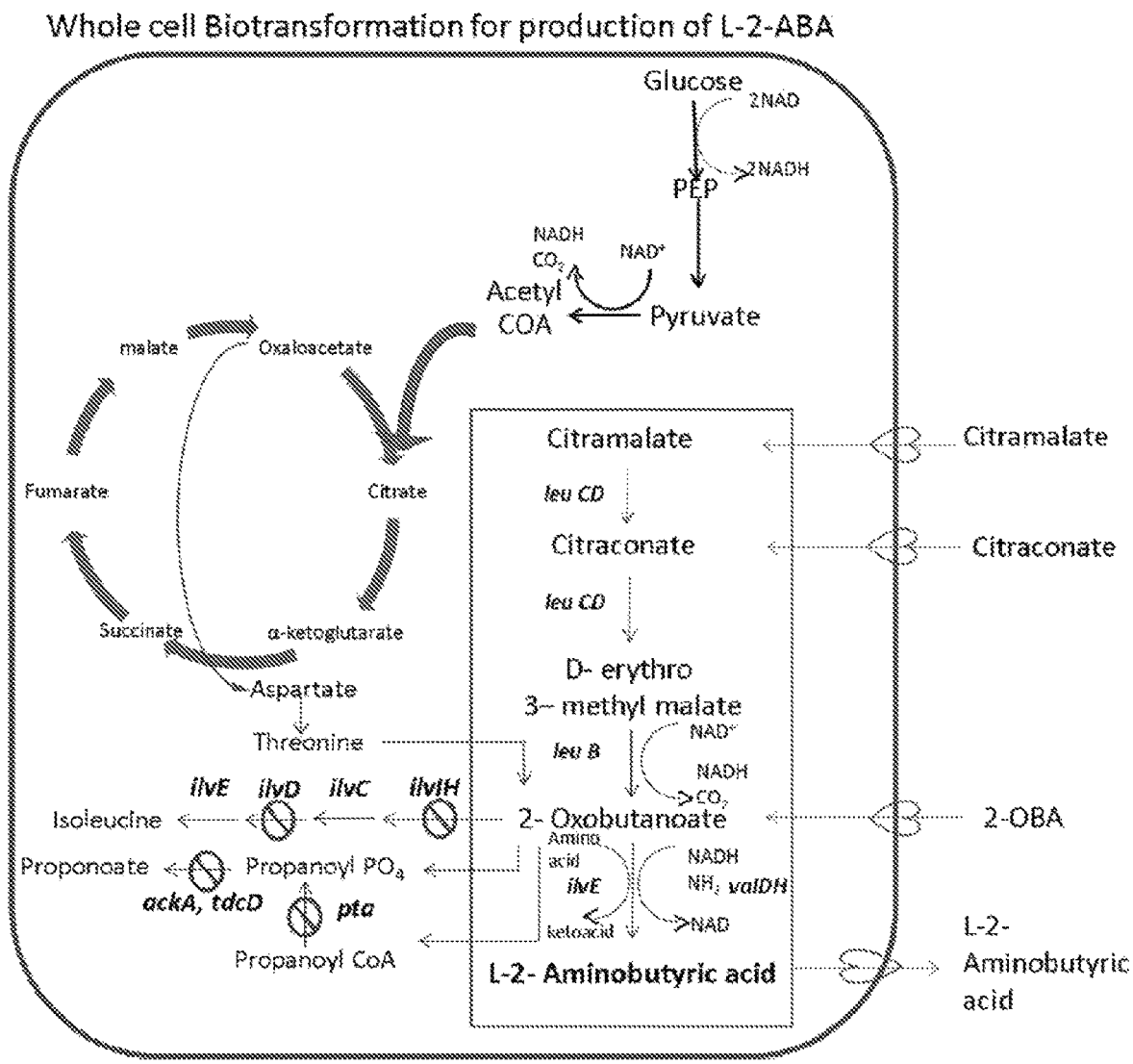
FIG. 3 illustrates an exemplary embodiment of the whole cell biotransformation for the preparation of L-2-aminobutyic acid.

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present invention relates to construction of enzymatic pathway carrying out series of reactions converting cheaper substrates like citraconate or citramalate to costlier products (L-2-ABA,) which in turn, would provide value addition to the process.

In the present invention, the process of production of L-2-ABA from substrates such as citraconate or citramalate involves isolation of genes namely leu B, leu CD, valDH or ilvE from various sources; and transforming said genes into a suitable host cell to express these corresponding enzymes. The host for biotransformation may comprise bacterial and eukaryotic origin such as *E. coli*, lactic acid bacteria and *Clostridium* sp. and various yeasts.

In the present invention, the multi-step synthetic pathway to produce L-2-ABA is an alternative isoleucine pathway. In this pathway, citramalate (2-methyl malate) is formed from the condensation of pyruvate and acetyl CoA by the enzyme citramalate synthase (CimA). The citramalate is converted to citraconate (2-methyl maleate) and then to D-erythro 3-methyl malate by isopropyl malate isomerase (Leu CD complex) which is further oxidized to 2-OB (2-oxo-butanoate) by isopropyl malate dehydrogenase (Leu B) that requires NAD⁺ and releases $CO_2$. The enzymes Leu CD and Leu B involved in leucine biosynthesis can catalyse the formation of 2-OB from citramalate. 2-OB is an immediate precursor of L-2-ABA. L-2-ABA being an unnatural amino acid, native enzymes are not available for efficient conversion. However, amino acid dehydrogenases and branched chain amino transferases catalyzing substrates with similar structure can convert the 2-OB (ketoacid substrate) to its respective amino acid, L-2ABA.

Valine dehydrogenase (ValDH) of *Streptomyces* sp. and branched chain amino transferases (IlvE) of *E. coli* and *Clostridium* sp. were selected for the conversion of 2-OB to L-2ABA.

The pathway from Citramalate or citraconate to L-2-ABA is thermodynamically favourable. The reaction catalyzed by Leu B requires conversion of NAD⁺ to NADH and releases $CO_2$. The last reaction catalyzed by valine dehydrogenase is a reductive amination of 2-OB to L-2-ABA that requires ammonia and reducing agent NADH which will regenerate NAD⁺. Therefore, the redox is balanced in the last two steps as the cofactor can be recycled and continuous removal of released $CO_2$ drives the multistep synthetic pathway for higher yield favouring synthesis in both cell free system and biotransformation.

The present inventors surprisingly found that the substrates can be converted to L-2-ABA by constructing a synthetic pathway involving genes leu CD, leu B, valDH/ilvE, which is highly efficient with the $k_{cat}/k_m$ in the range of $10^5$ $s^{-1}M^{-1}$, making the process viable.

In one embodiment, the present invention relates to a process of preparation of L-2-ABA in a cell free system utilizing isopropyl malate dehydrogenase (LeuB), isopropyl malate isomerase (Leu CD complex), valine dehydrogenase (ValDH). It may also utilize branched chain amino transferases (IlvE) instead of valine dehydrogenase (ValDH). Said enzymes are either in crude and immobilized form along with the required cofactors and other components to bring about the desired conversion.

Recombinant plasmids carrying the genes namely: pColaDuet-lLeuCD, pETDuet-lLeuB, pETDuet-lValDH were transformed individually into the host cell. The cells were cultured in complex medium and the enzymes expression was induced by IPTG (Isopropyl-β-D-thiogalactoside). The culturing conditions are provided such that maximum soluble expression of enzymes is obtained. The cells are harvested and lysed to release the enzymes. Either the crude lysate or the purified enzymes are used for the conversion process. The techniques to culture, harvest, lyse and isolate the enzymes are known a skilled artisan. In the said embodiment, the process to produce L-2-ABA comprises the steps of:
   a) transforming a microbial host cell to incorporate leu B, leu CD, valDH and ilvE to express enzymes LeuCD, LeuB, and ValDH;
   b) harvesting, lysing of the host cell to obtain the crude lysate;
   c) optionally isolating and purifying the enzyme from the crude lysate;
   d) converting a substrate selected from citramalate or citraconate using the crude lysate or the purified enzyme at a pH of 7 to 9.

It may also utilize branched chain amino transferases (IlvE) instead of valine dehydrogenase (ValDH). The enzymes are overproduced in the recombinant expression host under conditions such as to achieve maximum specific activity.

Immobilized enzymes may also be used instead of purified enzymes for the conversion of the substrate using routine skill and techniques.

The conversion of substrate is in a system which involves all the required cofactors and components for the efficient conversion. Such co-factors and components are selected from $MnCl_2$, KCl, NAD⁺, ammonium salts and buffers.

The process using crude, purified or immobilized enzyme produces at least 80 g/L or atleast 100 g/L in 12-18 hrs.

Isopropylmalate isomerase can be obtained from *Methanocaldococcus jannaschii*, *E. coli*, *Neurospora crassa*. Isopropylmalate dehydrogenase has been scouted from *Methanocaldococcus jannaschii*, *Thermophilus* sp., *E. coli*, *Acidothiobacillus ferroxidans*, *sulfolobus* sp. *Bacillus subtilis*. Amino acid dehydrogenase may be valine dehydrogenase, scouted from *Streptomyces* sp., *Alcaligenes faecalis*, *Kitasatospora aureofaciens* or leucine dehydrogenase scouted from *Bacillus* sp.

In another embodiment, the L-2-ABA can be produced by whole cell biotransformation from citramalate or citraconate by cells carrying the genes for expressing the three enzymes of the pathway namely LeuCD, LeuB, ValDH. The host cell used here is *E. coli*. The genes were transformed into host cells either as pCOlaDuet-1 BCD ValDH or pETDuet-1 CD, pCOlaDuet-1 LeuB ValDH. Citramalate or citraconate is added to the recombinant cells grown in a suitable medium containing co-factors and components. Media may comprise glucose, $KH_2PO_4$, $(NH_4)_2HPO_4$, $Na_2EDTA$, $MgSO_4$, thiamine HCl, trace metals along with additional ammonia source in the form of ammonium salts. Osmoprotectant such as sorbitol or glycerol may be added to the media for soluble expression of enzymes. Appropriate antibiotics for the particular plasmid and strain were added. Fresh media was changed without $MgSO_4$ during the expression and conversion of substrate. Optionally, the cells are permeabilized to improve the uptake of the substrate. The conversion was carried out in 20° C.-37° C. and quantified in HPLC.

In another embodiment the process to produce L-2-ABA involves biotransformation in a whole cell or a permeabilized cell. It comprises steps of:
   a) transforming a microbial host to incorporate valDH or ilvE;
   b) optionally incorporating leu B or leu CD,
   b) adding a substrate selected from citramlate citraconate or 2-oxobutanoate; and
   c) cultivating the host at a temperature of 20° C.-37° C. to express said enzymes in a suitable medium in order to obtain L-2-ABA.

The host for biotransformation may comprise bacterial and eukaryotic origin such as *E. coli*, lactic acid bacteria and *Clostridium* sp. and various yeasts.

The hosts may be transformed to express all three enzymes namely LeuCD, LeuB, ValDH. In alternative embodiments ilve may be incorporated to express Ilve instead of valDH.

In some embodiments, the host cell may contain LeuCD or LeuB as native enzymes. In such embodiments the substrates may be 2-oxobutanoate or citramalate or citraconate.

Isopropylmalate isomerase can be obtained from *Methanocaldococcus jannaschii*, *E. coli*, *Neurospora crassa*. Isopropylmalate dehydrogenase has been scouted from *Methanocaldococcus jannaschii*, *Thermophilus* sp., *E. coli*, *Acidothiobacillus ferroxidans*, *sulfolobus* sp. *Bacillus subtilis*. Amino acid dehydrogenase may be valine dehydrogenase, scouted from *Streptomyces* sp., *Alcaligenes faecalis, Kitasatospora aureofaciens* or leucine dehydrogenase scouted from *Bacillus* sp.

The present inventors also found that blocking the pathway leading to by-product isoleucine should be blocked to make 2-OB available for L-2-ABA formation thus favouring production of L-2-ABA in higher yield. Therefore, it is desirable to use a host having a nonfunctional isoleucine pathway wherein ilvD or ilvIH are knocked out. Or it would be desirable to use inhibitors for AHAS complex such as valine, sulfometuron methyl, imidazolinone, triazolopyrimidines, pyrimidinyloxobenzoates, sulfonyl amino carbonyl triazolinones.

Further to improve 2-OB availability for L-2-ABA formation, pathway leading to propionyl CoA and propionic acid may be blocked. Therefore, it is desirable to use a host having a nonfunctional propionyl CoA and propionic acid pathway wherein acetate kinase (ackA), propionate kinase (tdcD), phosphate acetyltransferase (pta) are knocked out.

The process to produce L-2-ABA in a whole cell or a permeabilized cell results in production of 20 g/L or atleast 40 g/L may be produced in 15-20 hrs.

The complete process of production of L-2-ABA from citraconate by constructing a synthetic pathway containing genes involved in amino acid biosynthesis from various sources namely LeuB, Leu CD, ValDH shall now be described stepwise with reference to accompanying experiments provided to assist in a comprehensive understandings of exemplary embodiments of the invention. It includes various specific details of the process to assist in that understanding but these are to be regarded as merely exemplary. It is assumed that a person skilled in the art can make use of the above description in its widest scope. The preferred embodiments and examples are therefore to be regarded merely as descriptive but in no way limiting disclosures.

The present inventor has obtained pETDuet-1 and pCOLADuet-1 vectors from Novogen. The *E. coli* strain BL21DE3 Codon plus RP was obtained IIT Madras on request.

A. Cell Free Enzymatic Biotransformation Experiments
I. Conversion of Citraconate to L-2-ABA Experiment 1

The enzymatic cell free conversion experiments were set up to convert 10 mM to 2 M citraconate to 10 mM to 2 M L-2-ABA catalyzed by the enzymes, LeuCD, LeuB and ValDH that are either used as crude cell lysate or partially or completely purified.

The recombinant plasmids carrying the genes namely: pColaDuet-lLeuCD, pETDuet-lLeuB, pETDuet-lValDH were transformed individually into a *E. coli*. The cells were cultured in complex medium and the enzymes expression was induced by IPTG (Isopropyl-β-D-thiogalactoside). The culturing conditions are provided such that maximum soluble expression of enzymes is obtained. The cells are harvested and lysed to release the enzymes. Either the crude lysate or the purified enzymes are used for the conversion process.

The conversion of citraconate to L-2-ABA is carried out in a range of pH 7-pH 9. Crude lysate or the purified enzymes are added to the conversion reaction where the other components required for the conversion are present. LeuCD converts citraconate to D-erythro 3-methyl malate which is converted to 2-OB by LeuB. The conversion by the enzyme LeuB requires 1 to 50 mM of $MnCl_2$, 10 mM to 300 mM of KCl. As the reaction is redox balanced in the last two step only 100 uM to 15 mM of $NAD^+$ is required. In the last step catalyzed by ValDH, 2-OB is converted to L-2-ABA by reductive ammination for which 10 mM to 2 M ammonium salts are provided in the reaction. The NADH required in this step in obtained from previous step and regenerated as $NAD^+$. The conversion was carried out at a temperature of 25° C. to 37° C. either in volume of 10 ml to 5 L scale in a bioreactor.

Experiment 2

The enzymatic cell free conversion experiments were set up to convert 10 mM to 2 M citraconate to 10 mM to 2 M L-2-ABA catalyzed by the enzymes, LeuCD, LeuB and IlvE that are either used as crude cell lysate or partially or completely purified.

The recombinant plasmids carrying the genes namely: pColaDuet-lLeuCD, pETDuet-lLeuB, pETDuet-lIlvE were transformed individually into the *E. coli* or yeast. The cells were cultured in complex medium and the enzymes expression was induced by IPTG. The culturing conditions are provided such that maximum soluble expression of enzymes is obtained. The cells are harvested and lysed to release the enzymes. Either the crude lysate or the purified enzymes are used for the conversion process.

The conversion of citraconate to L-2-ABA is carried out in a range of pH 7-pH 9. Crude lysate or the purified enzymes are added to the conversion reaction where the other components required for the conversion are present. LeuCD converts citraconate to D-erythro 3-methyl malate which is converted to 2-OB by LeuB. The conversion by the enzyme LeuB requires 1 to 50 mM of $MnCl_2$, 10 mM to 300 mM of KCl and $NAD^+$. In the last step catalyzed by ilvE, 2-OB is converted to L-2-ABA by transamination for which 10 μM to 2 mM of Pyridoxal $PO_4$, 10 mM to 2 M of Glutamic acid are provided in the reaction. The conversion was carried out at a temperature of 25° C. to 37° C. either in volume of 10 mL to 5 L scale in a bioreactor.

B. Whole Cell Biotransformation Experiments by Using Recombinant Cell:

Experiment 3: Citraconate Biotransformation by Cells Containing Over-Expressed LeuB, LeuCD, ValDH L-2-ABA can be produced by whole cell biotransformation from citramalate or citraconate by cells carrying the genes for expressing the three enzymes of the pathway namely LeuCD, LeuB, valDH. The host cell used here is *E. coli*. The genes were transformed into host cells either as pCOlaDuet-1 BCD valDH or pETDuet-1 CD, pCOlaDuet-1 LeuB valDH. An amount of 1 g to 100 g/L of either citramalate or citraconate is added to the recombinant cells grown in the defined medium containing 5-50 g/L of glucose, $KH_2PO_4$, $(NH_4)_2HPO_4$, $Na_2EDTA$, $MgSO_4$, thiamine HCl, trace metals along with additional ammonia source in the form of ammonium salts. Osmoprotectant such as sorbitol or glycerol may be added to the media for soluble expression of enzymes. Appropriate antibiotics for the particular plasmid and strain were added. Fresh media was changed without $MgSO_4$ during the expression and conversion of substrate. Alternatively, the cells are permeabilized to improve the uptake of the substrate. The conversion was carried out in 20° C.-37° C. and quantified in HPLC.

Experiment 4: Citraconate Biotransformation Cells Containing Over-Expressed LeuB, LeuCD, IlvE L-2-ABA can be produced by whole cell biotransformation from citramalate or citraconate by cells carrying the genes for expressing the three enzymes of the pathway namely LeuCD, LeuB, ilvE. The host cell used here is *E. coli*. The genes were transformed into the host cell either as pCOlaDuet-1 BCD IlvE or pETDuet-1 CD, pCOlaDuet-1 LeuBIlvE. An amount of 1 g to 100 g/L of either citramalate or citraconate is added to the recombinant cells grown in the defined medium containing 5-50 g/L of glucose, $KH_2PO_4$, $(NH_4)_2HPO_4$, $Na_2EDTA$, $MgSO_4$, thiamine HCl, trace metals along with glutamate. Osmoprotectant such as sorbitol or glycerol may be added to the media for soluble expression of enzymes. Appropriate antibiotics for the particular plasmid and strain were added. Alternatively, the cells are permeabilized using reagents such as toluene tween, chelating agents using routine techniques to improve the uptake of the substrate. The conversion was carried out in 20° C.-37° C. and quantified in HPLC. When 2.7 g/L citraconate was fed to the host cells, the native enzymes of the host namely LeuCD, LeuB, IlvE, converted the substrate to L-2-ABA (Table 2).

Experiment 5: Citraconate Biotransformation Cells Containing Over-Expressed ValDH (Native LeuB and LeuCD)

L-2-ABA can be produced by whole cell biotransformation from citramalate or citraconate by cells carrying the gene valDH. The conversion of the substrate to 2-OB is carried out by the native enzyme LeuCD, LeuB in the host cell. The host cell used here is *E. coli*. The gene was transformed into the host cell either as pCOlaDuet-1 valDH or pETDuet-1valDH. An amount of 1 g to 100 g/L of either citramalate or citraconate is added to the recombinant cells grown in complex media like glucose yeast extract or defined medium which may containing 5-50 g/L of glucose, $KH_2PO_4$, $(NH_4)_2HPO_4$, $Na_2EDTA$, $MgSO_4$, thiamine HCl, trace metals along with additional ammonia source in the form of ammonium salts. Osmoprotectant such as sorbitol or glycerol may be added to the media for soluble expression of enzymes. Fresh media was changed without $MgSO_4$ during the expression and conversion of substrate. Appropriate antibiotics for the particular plasmid and strain were added. Alternatively, the cells are permeabilized to improve the uptake of the substrate. The conversion was carried out in 20° C.-37° C. and quantified in HPLC.

Experiment 6: Citraconate Biotransformation Cells Containing Native/Over-Expressed IlvE (Native LeuB and LeuCD)

L-2-ABA can be produced by whole cell biotransformation of citraconate or citramalate by the host cells containing native LeuCD, LeuB and IlvE (Table 2).

L-2-ABA can also be produced by whole cell biotransformation from citramalate or citraconate by cells carrying over-expressed IlvE. The conversion of the substrate to 2-OB is carried out by the native enzyme LeuCD, LeuB present in the host. The host cell used here is *E. coli*. The gene was transformed either as pCOlaDuet-1 ilvE or pETDuet-1 ilvE into the host cell. An amount of 1 g to 100 g/L of either citramalate or citraconate is added to the recombinant cells grown in the complex media like glucose yeast extract or to the defined medium containing 5-50 g/L of glucose, $KH_2PO_4$, $(NH_4)_2HPO_4$, $Na_2EDTA$, $MgSO_4$, thiamine HCl, trace metals along with glutamate. Osmoprotectant such as sorbitol or glycerol may be added to the media for soluble expression of enzymes. Appropriate antibiotics for the particular plasmid and strain were added. Alternatively, the cells are permeabilized to improve the uptake of the substrate. The conversion was carried out in 20° C.-37° C. and quantified in HPLC.

Experiment 7: 2-Oxobutaonate Biotransformation by Cells Containing Over-Expressed ValDH (Native LeuB and LeuCD)

L-2-ABA can be produced by whole cell biotransformation from 2-oxobutanoate by cells carrying the gene valDH. The host cell used here is *E. coli*. The gene was transformed into the host cell either as pCOlaDuet-1 valDH or pETDuet-1valDH. An amount of 1 g to 100 g/L of either 2-oxobutanoate is added to the recombinant cells grown in complex media like glucose yeast extract or defined medium which may containing 5-50 g/L of glucose, $KH_2PO_4$, $(NH_4)_2HPO_4$, $Na_2EDTA$, $MgSO_4$, thiamine HCl, trace metals along with additional ammonia source in the form of ammonium salts. Osmoprotectant such as sorbitol or glycerol may be added to the media for soluble expression of enzymes. Fresh media was changed without $MgSO_4$ during the expression and conversion of substrate. Appropriate antibiotics for the particular plasmid and strain were added. Alternatively, the cells are permeabilized to improve the uptake of the substrate. The conversion was carried out in 20° C.-37° C. and quantified in HPLC. (Table 2)

TABLE 1

Yield of L-2-ABA with different enzymes

| S. no | Citraconate (mM) | L-2-ABA (mM) (duplicate readings) |
|---|---|---|
| 1 | 250 | 249, 246 (33 hrs) |
| 2 | 100 | 96, 80 (10 hrs) |
| 3 | 50 | 43, 42 (9 hrs) |

Results and Discussion:

Table 1 shows the production yield of 2-ABA from citraconate in cell free system catalyzed by the enzymes LeuCD, LeuB, ValDH. A conversion of 99.6% was obtained in case of 250 mM of citraconate. Whereas 96% and 86% was achieved in case of 100 mM and 50 mM citraconate respectively

TABLE 2

Details on the conversion of various substrates to L-2-ABA by the proposed pathway using whole cell biotransformation by the Host and clone cell

| s. no | Organism | Substrate fed g/L | Substrate consumed g/L | L-2-ABA formed in 24 h (g/L) |
|---|---|---|---|---|
| 1 | Host (containing Native LeuCD, LeuB and IlvE) | Citraconate-2.7 | 2.1 | 0.1 |
| 2 | Host (containing Native LeuCD, LeuB and IlvE) | 2-Oxobutanoate-10 | 5.0 | 0.25 |

TABLE 2-continued

Details on the conversion of various substrates to L-2-ABA by the proposed pathway using whole cell biotransformation by the Host and clone cell

| s. no | Organism | Substrate fed g/L | Substrate consumed g/L | L-2-ABA formed in 24 h (g/L) |
|---|---|---|---|---|
| 3 | Host (containing Native LeuCD, LeuB and IlvE) + pETDuet-1 valDH (clone) | 2-Oxobutanoate-10 | 7.0 | 6.0 |

Table 2 shows the production yield of 2-ABA from citraconate in whole cell biotransformation catalyzed by the native enzymes of the host cell namely LeuCD, LeuB, IlvE. Product titer of 100 mg/L was obtained from 2.1 g/L of citraconate that got consumed in 24 hours. The remaining citraconate consumed has got diverted for the production of isoleucine and propionic acid, which can be reduced by performing the same experiments in the proposed knockout strains (knockouts for isoleucine and propionic acid producing pathway enzymes).

Table 2 shows the production yield of 2-ABA from 2-Oxobutanoate in whole cell biotransformation catalyzed by the native ilvE in the host and by the overexpressed valine dehydrogenase in the clone. Product titer of 0.25 g/L and 6 g/L was obtained from 10 g/L of 2-Oxobutanoate in host and clone respectively in 24 hours. The remaining 2-oxobutanoate consumed has got diverted for the production of isoleucine and propionic acid, which can be reduced by performing the same experiments in the proposed knockout strains (knockouts for isoleucine and propionic acid producing pathway enzymes).

Advantage of Invention

The present invention provides an alternative process for the producing L-2-ABA in high yield. The process is economical as it utilizes less expensive substrates like citramalate or citraconate. The price of citramalate or citraconate is about US$ 0.5 to US$ 15 per kg. Whereas the currently available processes use expensive substrates like food and pharma grade. Further, feed grade threonine makes the purification process difficult.

Further, as disclosed above the present process engineers a pathway for L-2-ABA preparation, which is redox balanced. Whereas the method from threonine is not redox imbalanced and hence requires additional enzyme to recycle the cofactor NADH.

The enzymes utilised in the preparation of L-2-ABA from citraconate are highly efficient with $k_{cat}/k_m$ in the range of $10^5$ $s^{-1}M^{-1}$ in contrast with the enzymes utilised in the threonine process. As the enzymes are efficient, the scale of enzyme production can be brought down, which in turn will reduce the cost of production. Hence the preparation of L-2-ABA from citraconate or citramalate is highly feasible at an industrial scale.

The invention claimed is:

1. A process for production of L-2-Aminobutyric acid in a cell free system, comprising:
   a) transforming a microbial host cell to incorporate genes leu CD, leu B, and valDH to express enzymes being an isopropyl malate isomerase, an isopropylmalate dehydrogenase and a valine dehydrogenase;
   b) harvesting and lysing of the host cell to obtain a crude lysate comprising the isopropyl malate isomerase, the isopropylmalate dehydrogenase and the valine dehydrogenase;
   c) optionally isopurifying from the crude lysate the isopropyl malate isomerase, the isopropylmalate dehydrogenase and the valine dehydrogenase to produce isolated enzymes, or optionally immobilizing from the crude lysate the isopropyl malate isomerase, the isopropylmalate dehydrogenase and the valine dehydrogenase to produce immobilized enzymes; and
   d) contacting in a cell free system having a pH of 7 to 9 a substrate being citramalate or citraconate with the crude lysate, purified isolated enzymes or the immobilized enzymes to produce L-2-Aminobutyric acid.

2. The process as claimed in claim 1, wherein the step (d) is done in the presence of a cofactor selected from the group consisting of: $MnCl_2$, KCl, $NAD^+$, ammonium salts and buffers.

3. The process as claimed in claim 1, wherein L-2-Aminobutyric acid production in the step (d) is at least 80 g/L in 12-18 hours.

* * * * *